Sept. 20, 1966    O. G. FOULGER    3,274,514
PULSE COMPARATOR AND CONVERTER
Filed Feb. 18, 1964

INVENTOR.
ORSON G. FOULGER
BY
ATTORNEY.

United States Patent Office 3,274,514
Patented Sept. 20, 1966

3,274,514
PULSE COMPARATOR AND CONVERTER
Orson G. Foulger, Goleta, Calif., assignor to the United States of America as represented by the Secretary of the Navy
Filed Feb. 18, 1964, Ser. No. 346,062
1 Claim. (Cl. 332—1)

The invention described herein may be manufactured and used by or for the Government of the United States of America for governmental purposes without the payment of any royalties thereon or therefor.

This invention relates generally to signal conversion apparatus, and more particularly to a novel reference comparator which yields output pulses which are of polarity and time-width corresponding to input pulse amplitude relative to a reference amplitude.

While the invention is of general utility in many different circuit environments, by way of example it will be described herein with specific reference to its applicability for use in connection with means for providing a gain-controlling signal in an AGC (automatic gain control) amplifier control loop such as described in copending patent application Serial No. 270,773 entitled "Receiver System," filed April 4, 1963 by Langthorne Sykes et al.

It is an object of the present invention to provide an improved signal converter apparatus.

It is another object of this invention to provide an improved signal converter apparatus in which variable-amplitude pulse signals are converted into variable time-width pulse signals.

It is a further object of this invention to provide an improved reference comparator yielding output pulses which are of polarity sense dependent upon the lesser or greater amplitudes of input pulses relative to a reference input pulse amplitude, and which are of time-widths corresponding to the input and reference pulse amplitude differences.

These and other objects and advantages of this invention will be readily appreciated as the same becomes better understood by reference to the following description when considered in connection with the accompanying drawing wherein.

First briefly considering the above-mentioned exemplary environment of the present invention, the receiver-computer system described in the said copending application functions to derive steering signals for controlling the guidance of a passive-homing missile intended for destruction of radar installations, the receiver-computer system, for such steering signal derivation purpose, including an RF pulse receiving antenna array having four sections and being characterized by four field pattern lobes which diverge substantially symmetrically relative to the missile axis. In response to reception of each radio-frequency pulse from the target radar source, four receiver channels associated with the antenna array and including demodulators correspondingly yield a set of four time-coincident D.C. pulses, hereinafter termed video pulses, which may be generally identified as the products IA, IB, IC and ID, wherein I represents an intensity factor common to each video pulse of a set, and of value dependent upon the power output of the target radar installation, upon range to the target and upon attitude of the target relative to the missile, and wherein A, B, C and D represent amplitude factors which are of values dependent upon missile axis orientation relative to the line-of-sight of the target. Dual-channel target signals derived from the signals IA, IB, IC and ID, for use in further deriving missile steering control signals, are applied to a pair of video pulse amplifiers forming part of a pair of servo circuits employed for missile guidance command. For the purpose of controlling the gain of these video pulse amplifiers in a manner to normalize the intensity factor I in the duel-channel target signals delivered by these video pulse amplifiers, as disclosed in the above-mentioned copending application, the receiver-computer of the anti-radar missile further includes a so-called sum channel as illustrated in FIG. 1 wherein, for the purpose of facilitating cross-reference if desired, the same designating numerals and characters as in the said copending application are employed.

Figure 1:
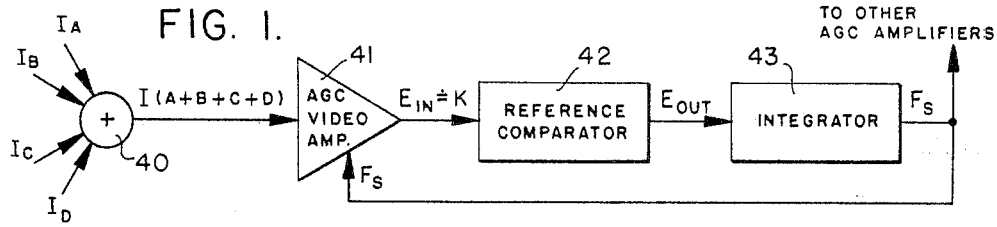
FIG. 1 is a block diagram representation of an exemplary circuit environment for the present invention.

Referring to FIG. 1, therefore, as an example of environmental circuitry in which the reference comparator according to the present invention may be utilized, the video pulses IA, IB, IC and ID applied to a summation circuit 40, and likewise the resultant or summation video pulse $I(A+B+C+D)$ delivered to an AGC amplifier 41, are in this instance to be understood as positive, of the order of one microsecond in time-width, and repetitive at an audio frequency rate of the order of 1000 pulses per second. It may be noted at this point that the repetitively occurring input pulses to AGC amplifier 41 may exhibit comparatively large amplitude excursions during missile attack action against a radar target, but that the AGC amplifier 41 output pulses (reference comparator 42 input pulses $E_{in}$, in this instance likewise positive, while being of much greater amplitudes than the AGC amplifier input pulses, are variable in amplitude to a very much reduced extent because of the AGC action (and the high gain characteristic of reference comparator 42) in the illustrated circuit, the reference comparator input pulses being forced by AGC loop action to substantially a predetermined comparator input pulse reference amplitude hereinafter termed K, differing therefrom only by a comparatively small error signal $\epsilon$ which is variable in sense and magnitude during missile attack action. Reference comparator 42 operates to effect conversion of its variable-amplitude input pulses ($E_{in}$) to output pulses ($E_{out}$) which are of fixed amplitude but of polarity sense dependent upon the lesser or greater amplitude of the input pulses relative to reference pulse amplitude K, and which are of time-widths proportional to the input and reference pulse amplitude difference (i.e., to the magnitude of error signal $\epsilon$). Integrator 43 operates to provide a gain-controlling signal $F_s$, corresponding to continuous integration of the variable-width, variable-polarity output pulses $E_{out}$ delivered by reference comparator 42, and for such purpose may be similar to that disclosed in U.S. Patent 3,119,029 entitled "Transistor Bipolar Integrator," issued January 24, 1964, by Duane J. Russell, or may be of any suitable conventional type enabling sufficient dynamic range of output signal without output-voltage limiting effects. The smoothed gain-controlling feedback signal $F_s$ as delivered by integrator 43 continuously controls the gain of AGC amplifier 41 (and of other AGC amplifiers as earlier mentioned and as indicated) in such manner as to adjust the output signal amplitudes to the reference pulse amplitude K, normalizing the intensity factor I in the output signals of the AGC amplifiers.

While it is possible, for use in the aforementioned receiver-computer system, to employ a reference comparator which merely by means of either a summation or a subtraction circuit (dependent upon reference pulse polarity) effects comparison of input and reference pulse amplitudes, yielding resultant pulses of constant time-width and variable amplitudes, and to integrate such variable-amplitude resultant pulses to provide the gain-controlling signal $F_s$, such technique when employed with video pulses of very short time-widths has been found to yield undesirable distortions of output pulses and comparatively narrow dynamic error range capability. The novel reference comparator 42 as disclosed herein has been found to provide significant improvements in operating characteristics.

Figure 2:
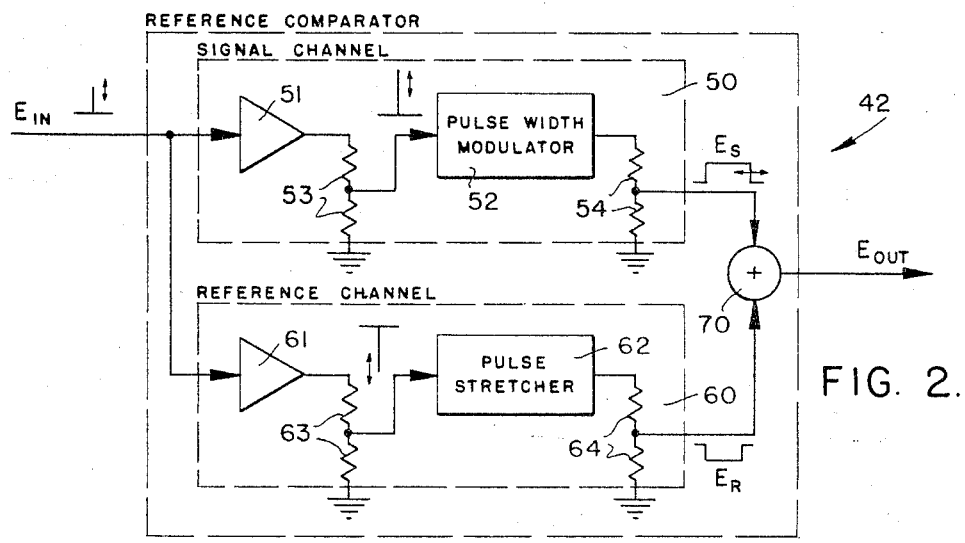
FIG. 2 is a schematic block diagram of a reference comparator embodying the present invention.

Referring now to the exemplary embodiment of the novel reference comparator 42 as shown in block diagram form in FIG. 2, each of the units therein may separately be entirely conventional in character and design. In the signal channel 50 and in the reference channel 60, amplifiers 51 and 61 function as buffer or isolating stages in addition to providing amplification action; amplifier 51 here provides noninverted pulse signals and amplifier 61 provides inverted pulse signals, as indicated. Pulse-width modulator 52 in signal channel 50 functions to effect pulse amplitude to time-width conversion, delivering pulses $E_s$ characterized by constant amplitude but time-widths proportional to the variable amplitudes of its input signal and correspondingly proportional to the variable amplitudes of the pulses $E_{in}$; for such purpose pulse-width modulator 52 may be supplied in the form of any one of various pulse amplitude to width converters as employed in PDM (pulse duration modulation) telemetry systems, and preferably of type wherein the percentage change in converter output pulse $E_s$ time-width is considerably greater than the percentage change in input pulse amplitude. Pulse stretcher 62 in reference channel 60, when triggered, operates to provide a reference pulse $E_r$ likewise of constant amplitude but of opposite polarity to that of $E_s$, and further of fixed time-width; for such purpose pulse stretcher 62 may for example comprise a so-called "one-shot" (monostable) multivibrator such as that shown at page 547 in "Electronic Measurements" by Terman and Pettit (McGraw-Hill Book Co., 1952, 2d ed.). In this instance pulse width modulator 52 and pulse stretcher 62 are designed to be triggered, respectively, by positive and negative pulses applied thereto, and to provide output pulses $E_s$ and $E_r$ of equal amplitudes and likewise of positive and negative polarities, respectively. Pulse width modulator 52 and pulse stretcher 62 are further so designed that the time-widths of their output pulses $E_s$ and $E_r$ are considerably greater than that of the input pulses $E_{in}$, with the duration of pulse $E_s$ being equal to the fixed time-width of pulse $E_r$ when it arises from a pulse $E_{in}$ of precisely the predetermined reference amplitude K. By way of example, pulse width modulator 52 may be designed or adjusted in such manner as to make its output pulses $E_s$ have an average time-width (i.e., that time-width which corresponds to an input pulse $E_{in}$ of amplitude K) of 40-microsecond duration; in such instance pulse stretcher 62 would be designed or adjusted to provide reference pulses $E_r$ of 40-microsecond duration. The input pulse $E_{in}$ thresholds at which pulse width modulator and pulse stretcher units 52 and 62, respectively, individually begin to operate are of course dependent upon the electronic engineering design of these units and upon the gains of the amplifiers 51 and 61, and it is to be understood that these thresholds are preferably made substantially equal, by suitable selection or adjustment of circuit element values at any convenient points within these units. As a matter of convenience for illustration purposes, the latter adjustment may here be understood as accomplished by making the gains of amplifiers 51 and 61 slightly greater than necessary, and by providing coupling circuits in the signal and reference channels in the form of voltage dividers 53 and 63, respectively, employing resistors which are proportioned to make the operating thresholds of the pulse width modulator and pulse stretcher units 52 and 62 substantially equal. Pulses $E_s$ and $E_r$ are made of exactly equal amplitude by similar use of voltage divider type output circuits 54 and 64 for pulse width modulator 52 and pulse stretcher 62, respectively. Reference comparator 42 is completed by a summation unit 70 which in its simplest form may be a passive network, in any event of suitable type operating to effect addition of the pulses $E_s$ and $E_r$ to provide output pulses $E_{out}$ as indicated in FIG. 3.

Figure 3:
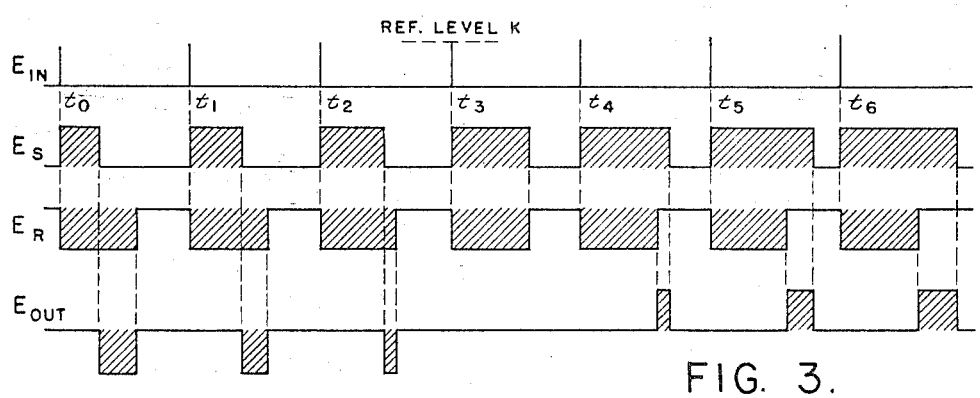
FIG. 3 illustrates input pulses of variable amplitude relative to a reference amplitude level, and corresponding intermediate and output pulses of the novel reference comparator.
Figure 4:
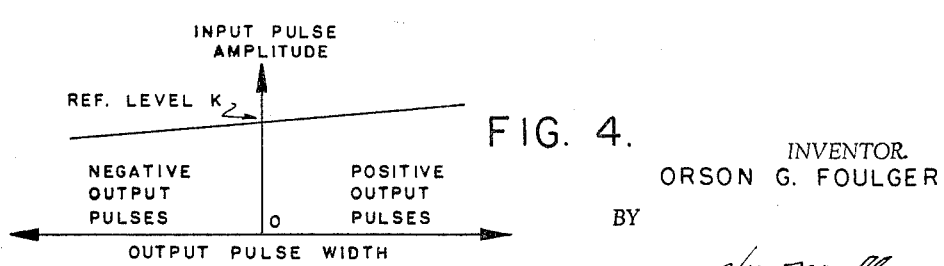
FIG. 4 illustrates in graphic form the linear relationship between magnitude of reference comparator output pulse time-widths and input pulse amplitudes.

FIG. 3 illustrates a sample sequence of input pulses $E_{in}$ with the first occurring at instant $t_0$ at an amplitude lower than reference level K and with the ensuing pulses occurring at instants $t_1$ to $t_6$ at progressively larger amplitudes. The leading edges of pulse width modulator output pulses $E_s$ and pulse stretcher output pulses $E_r$ are of course in time coincidence with input pulses $E_{in}$. At the instant $t_3$ at which the input pulse $E_{in}$ is of amplitude K, pulse stretcher 62 output pulse $E_r$ and pulse width modulator output pulse $E_s$ are of exactly the same time-width. Reference comparator output pulses $E_{out}$, as indicated, are either positive or negative, dependent in this instance upon the greater or lesser amplitude, respectively, of pulses $E_{in}$ relative to reference level K, and of time-width proportional to the amplitude difference between the input pulse and reference level K. Operation of the reference comparator 42 is thus linear as illustrated in the FIG. 4 transfer characteristic presenting the relationship between output pulse $E_{out}$ time-width and input pulse $E_{in}$ amplitude.

Obviously many modifications and variations of the present invention are possible in the light of the above teachings. It is therefore to be understood that within the scope of the appended claim the invention may be practiced otherwise than as specifically described.

What is claimed is:

A signal conversion apparatus for deriving, from an input signal of unknown periodicity, or aperiodic, and consisting of variable-amplitude input pulses, signal conversion apparatus output pulses having time-widths and polarities corresponding to the magnitude and algebraic sense, respectively, of amplitude difference of input pulse amplitude relative to a predetermined reference amplitude, said apparatus comprising:

(a) a reference channel operating to be triggered by said input pulses to provide reference channel output pulses of fixed polarity, fixed amplitude and fixed time-width;

(b) a signal channel operating to convert said input pulses to signal channel output pulses of fixed polarity, of fixed amplitude, and of time-widths varying directly with input pulse amplitude, said signal channel output pulses having a time-width range embracing a reference time-width corresponding to an input pulse having said predetermined reference amplitude;

(c) means for equalizing the amplitudes of said reference channel and signal channel output pulses; and (d) an amplitude summer for combining corresponding reference channel and signal channel output pulses, after their amplitudes are equalized, to provide signal conversion apparatus output pulses of time-widths and polarities corresponding to the magnitude and algebraic sense, respectively, of signal channel output pulse time-width relative to reference channel output pulse time-width.

References Cited by the Examiner

UNITED STATES PATENTS 3,042,754    7/1962    McManis _____ 332—9 X

ROY LAKE, *Primary Examiner.*

A. L. BRODY, *Assistant Examiner.*